United States Patent [19]

Sims et al.

[11] 3,764,663

[45] Oct. 9, 1973

[54] CHLORINE DIOXIDE PRODUCTION

[75] Inventors: Leslie L. Sims, Mobile, Ala.; Walter W. Lawrence, Jr., Baton Rouge, La.

[73] Assignee: Ethyl Corporation, New York, N.Y.

[22] Filed: Oct. 31, 1972

[21] Appl. No.: 302,485

Related U.S. Application Data

[63] Continuation-in-part of Ser. No. 55,581, July 16, 1970, abandoned.

[52] U.S. Cl.................. 423/478, 423/500, 252/187
[51] Int. Cl. ........................ C01b 11/02, C01b 7/02
[58] Field of Search.................. 423/478, 477, 479, 423/480, 500

[56]  References Cited
UNITED STATES PATENTS

| | | | |
|---|---|---|---|
| 2,736,636 | 2/1956 | Day et al. ........................... | 423/479 |
| 2,863,722 | 12/1958 | Rapson ............................... | 423/478 |
| 3,563,702 | 2/1971 | Partridge et al. ................... | 423/478 |

FOREIGN PATENTS OR APPLICATIONS

| | | | |
|---|---|---|---|
| 597,199 | 1/1948 | Great Britain ...................... | 423/478 |

*Primary Examiner*—Edward Stern
*Attorney*—Donald L. Johnson et al.

[57]  ABSTRACT

A process for the manufacture of chlorine dioxide by the reaction of a non-oxidizable acid with chlorate and a chloride in the presence of a catalyst which is an ammonium salt.

6 Claims, No Drawings

CHLORINE DIOXIDE PRODUCTION

CROSS REFERENCE TO RELATED APPLICATION

This application is a continuation-in-part of application Ser. No. 55,581, filed July 16, 1970, now abandoned.

BACKGROUND OF THE INVENTION

Chlorine dioxide has recently achieved commercial significance in the fields of pulp bleaching, water purification, textile bleaching, and other oxidizing procedures. Unfortunately, prior art processes for the manufacture of chlorine dioxide all result in a fairly expensive product.

It is therefore a principal purpose of the present invention to provide a process for the more economical preparation of chlorine dioxide in high yield.

SUMMARY OF THE INVENTION

The present invention provides a process for the manufacture of chlorine dioxide by the reaction of a non-oxidizable acid with a chlorate and a chloride, the improvement comprising carrying out the reaction in the presence of a catalyst selected from the group consisting of ammonium salts.

DESCRIPTION OF THE PREFERRED EMBODIMENTS

In the process of the present invention the chlorate and the chloride are dissolved in a non-oxidizable acid to produce the following reaction:

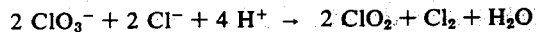

$$2\ ClO_3^- + 2\ Cl^- + 4\ H^+ \rightarrow 2\ ClO_2 + Cl_2 + H_2O$$

Representative acids which are suitable include, for example, sulfuric, fluosilicic, phosphoric, perchloric, hydrofluoric, i.e., any strong acid containing an anion not subject to reactions either with chlorine or chlorine dioxide and which is reasonably stable.

Unfortunately, with the use of the above acids, it is frequently difficult to suppress the formation of chlorine rather than chlorine dioxide. The present invention provides a process whereby the production of chlorine is suppressed and the yield of chlorine dioxide is increased by utilization of a catalyst. Among the catalysts which may be employed, ammonium sulfate is preferred because of its availability and particularly excellent results, but other ammonium salts are suitable, such as ammonium nitrate, ammonium chloride, ammonium fluoride, and the like.

The reaction in the presence of one of the catalysts is suitably carried out at a temperature in the range of from 0° to about 150° C and preferably from about 50° to about 125° C. Especially suitable are catalyst concentrations of from about 0.1 to about 10 grams per liter of catalyst in reaction solution. Concentrations outside these ranges may be employed, though with not as good results.

The chlorate and chloride are used in substantially stoichiometric quantities and are preferably present in the reactor at concentrations below about 0.5 molar. More preferably, the concentrations of chlorate and chloride are maintained below about 0.1 molar.

Although sodium chloride and sodium chlorate are preferred, among other reasons because of the relatively low cost of these salts, other cations than sodium may be employed so long as the salt is soluble in the acid solution employed, and will form in this acid solution chloric and hydrochloric acids. Chlorides and chlorates of metals capable of exhibiting stable mono- or divalency are suitable, such as the alkali and alkaline earth metals, cadmium, lead, nickel, copper, cobalt, zinc and silver.

Chlorine and chlorine dioxide are gases at ordinary temperatures and have limited solubility in water, and therefore they are removed from the reactor solution by an inert gas stream or by maintaining the reactor under vacuum. Of course, continuous removal of such gaseous reaction products causes the reactions forming them to proceed efficiently whereby the chlorate and chloride in the reactor are converted into chlorine dioxide and chlorine in high yield.

Suitable reaction conditions may easily be maintained in a reactor provided with two liquor inlets below the surface of the reaction medium, one or more gas inlets in or near the bottom of the reactor, and a gas outlet to remove the gaseous products of reaction. One liquor inlet introduces the acid, one the solution of chlorate and chloride, and the gas inlets usually admit air, but any other inert gas may be used. Since the molar concentrations of reactants must be kept within reasonable limits, a liquid outlet is also provided.

Acid feed rate is regulated to provide the desired acidity in the liquid, and feed rate of a solution containing chlorate and chloride in substantially stoichiometric proportions is regulated to provide the desired rate of production of the product mixture of chlorine dioxide and chlorine. Alternately, mixing of the chlorate and chloride may occur in situ upon separate introduction of the two materials.

The process of the present invention has an additional advantage in its ease of starting or stopping. The production of chlorine dioxide may be stopped by terminating the flow of entering solutions while maintaining the inert gas stream or partial vacuum until most of the chlorine dioxide has been swept from the reactor. For restarting, the air or vacuum, acid, and chlorate-chloride streams are simply restarted with no further necessary adjustments. The rate of production of chlorine dioxide may be changed by proportionately changing the rates of flow of the feed streams.

The following example is illustrative and not limiting of the process of the present invention.

EXAMPLE

A solution of 5 grams sodium chlorate and 2 grams sodium chloride in 18 milliliters water was charged to a 30 cubic centimeter syringe. A 10 cubic centimeter syringe was charged with 6.7 grams concentrated fluosilicic acid. These were attached to a 100 milliliter three-necked flask equipped with an air bubbler. A catalyst, 0.02 gram ammonium sulfate, was charged to the flask and the syringes driven slowly to add the reagents over a period of twenty minutes. Reaction temperature was maintained at 90°–95° C. Air was continuously pulled at 500 milliliters per minute through the solution and atmosphere of the flask to sweep product chlorine dioxide into a potassium iodide-hydrogen chloride scrubber (100 milliliters of 1.134 N HCl and 40 grams KI in one liter of water). After 1.3 hours, the contents of the scrubber were diluted to the mark in a two-liter volumetric flask. 100 milliliter samples were titrated with 0.1521 N sodium thiosulfate and 1.007 N sodium hydroxide. From this evaluation it was determined that an 84 percent yield of chlorine dioxide was achieved.

What is claimed is:

1. A process for the manufacture of chlorine dioxide by reacting a chlorate and a chloride of an alkali metal or an alkaline earth metal in the presence of a non-oxidizable acid at a temperature of from about 0° C to about 150° C in the presence of a catalytic quantity of ammonium sulfate.

2. The process of claim 1 wherein said reaction is carried out at a temperature of from about 50° C to about 125° C.

3. The process of claim 1 wherein said ammonium sulfate is present in a concentration of from about 0.1 to about 10 grams per liter of reaction solution.

4. The process of claim 1 wherein said chlorate and chloride are present in substantially stoichiometric quantities.

5. The process of claim 1 wherein said chlorate and chloride are sodium chloride and sodium chlorate.

6. The process of claim 1 wherein said non-oxidizable acid is fluosilicic acid.

* * * * *